United States Patent

Kinnunen et al.

[11] Patent Number: 6,167,079
[45] Date of Patent: Dec. 26, 2000

[54] METHOD FOR IDENTIFYING DATA TRANSMISSION RATE, AND A RECEIVER

[75] Inventors: Pasi Kinnunen; Ilkka Keskitalo, both of Oulu, Finland

[73] Assignee: Nokia Telecommunications Oy, Espoo, Finland

[21] Appl. No.: 08/894,787

[22] PCT Filed: Dec. 20, 1996

[86] PCT No.: PCT/FI96/00691

§ 371 Date: Aug. 28, 1997

§ 102(e) Date: Aug. 28, 1997

[87] PCT Pub. No.: WO97/24848

PCT Pub. Date: Jul. 10, 1997

[30] Foreign Application Priority Data

Dec. 29, 1995 [FI] Finland ..................................... 956358

[51] Int. Cl.[7] ............................ H04B 3/46; H04B 17/00; H04Q 1/20

[52] U.S. Cl. ........................... 375/225; 370/232; 370/252

[58] Field of Search ..................................... 370/234, 235, 370/252, 232, 233; 375/224, 225, 259, 260, 207, 209, 210, 343, 222, 142, 150

[56] References Cited

U.S. PATENT DOCUMENTS

| | | |
|---|---|---|
| 4,584,694 | 4/1986 | Gumacos . |
| 4,887,280 | 12/1989 | Reisenfeld . |
| 5,396,516 | 3/1995 | Padovani et al. . |
| 5,524,122 | 6/1996 | Lepitre et al. ............................ 375/222 |
| 5,619,524 | 4/1997 | Ling et al. .............................. 375/200 |
| 5,771,226 | 6/1998 | Kaku ....................................... 370/232 |

FOREIGN PATENT DOCUMENTS

| | | |
|---|---|---|
| 0713305 | 5/1996 | European Pat. Off. . |
| 962326 | 6/1996 | Finland . |
| 95/01032 | 1/1995 | WIPO . |
| 95/08888 | 3/1995 | WIPO . |
| 97/24816 | 7/1997 | WIPO . |

Primary Examiner—Chi H. Pham
Assistant Examiner—Jean B Corrielus
Attorney, Agent, or Firm—Pillsbury Madison & Sutro

[57] ABSTRACT

A method and receiver for identifying data transmission rate from a signal which has several transmission rate alternatives. The signal contains modulation symbols (201 to 206) which are formed as a vector and which are submatrices of a known, essentially orthogonal transform matrix selected on the basis of a combination of bits to be transmitted. A correlation is formed between a received modulation symbol (201 to 206) and the known modulation matrix, as a result of which correlation vectors (301 to 306) are produced, each correlation vector being composed of correlation values (311) which are used to detect the signal. By utilizing the correlation values (311) of one or more correlation vectors (301 to 306), an estimate (556) is formed for each data transmission rate representing the probability of the data transmission rate of the signal, and the estimates (556) are used to select the most probable data transmission rate to be used for detecting the signal.

12 Claims, 3 Drawing Sheets

METHOD FOR IDENTIFYING DATA TRANSMISSION RATE, AND A RECEIVER

This application is the national phase of international application PCT/FI96/00691, filed Dec. 20, 1996x which was designated the U.S.

FIELD OF THE INVENTION

The present invention relates to a method for identifying data transmission rate from a signal which has several transmission rate alternatives and which comprises modulation symbols which are formed as a vector and which are submatrices of a previously known, essentially orthogonal transform matrix selected on the basis of a combination of bits to be transmitted in which method a correlation is formed between a received modulation symbol and the previously known modulation matrix, as a result of which a correlation vector is produced which comprises correlation values and by means of which a signal is detected.

The present invention further relates to a receiver receiving a signal which has several data transmission rate alternatives and which comprises modulation symbols which are formed as a vector and which are submatrices of a previously known, essentially orthogonal transform matrix selected on the basis of a combination of bits to be transmitted which receiver is arranged to form a correlation between a received modulation symbol and the previously known modulation matrix, as a result of which a correlation vector is produced which comprises correlation values and by means of which a signal is detected.

BACKGROUND OF THE INVENTION

The advance of CDMA technology has brought about new ways of using more effectively radio frequencies on the whole spectrum, which in comparison to TDMA and FDMA systems provides a possibility for a greater number of users per a frequency channel, for example, a faster power regulation, a more effective use of data transmission rates and a better connection between a base station and a subscriber terminal equipment. The possibility to use different data transmission rates in the subscriber terminal equipment adds to the capacity of the system as when a speech connection is not in use or when the amount of data to be transferred is small, the capacity of the cellular radio system can be increased at a smaller data transmission rate, interference being diminished for other users. In future CDMA standards, data transmission rate can be changed specifically for each frame on the basis of speech activity so that the rate in a single data transmission frame is the same, while a frame generally comprises 16 transmission time slots.

The data transmission rates to be transmitted, of which there are typically four, are divided at random to said sixteen different transmission time slots on the basis of a long spreading code, whereby the greatest data transmission rate (e.g. 9,600 kbps) uses all 16 time slots, when the data transmission rate is half of the greatest data transmission rate, eight time slots out of sixteen are used, when the data transmission rate is fourth of the greatest data transmission rate, four time slots out of sixteen are used, and the smallest data transmission rate is eighth of the greatest data transmission rate and only two time slots out of sixteen transmission time slots are in use.

In the base station the transmission time slots used by all the data transmission rates can be calculated and detected when the used long spreading code is known. Different data transmission rates also share a feature that all the transmission time slots of the next smallest data transmission rate by one are the same (that is, the greatest data transmission rate has eight of the same transmission time slots as a lower data transmission rate.)

When different data transmission rates are being used, the base station should identify the transmitted data transmission rate, which is not very easy. Various interferences and fadings in the radio channel make the identification of the data transmission rate difficult and it is difficult to calculate the data transmission rate from all data transmission rates to Viterbi decoding and a complicated equipment is required for it. In prior art solutions, a parallel Viterbi decoding is used separately for each data transmission rate. In that case the possible calculated information of a received signal on the data transmission rate is not utilized in any way. All the data transmission rates are examined one by one and the decision of the data transmission rate of an incoming signal is made specifically for each frame by means of other check routines. Viterbi decoding by parallel processing requires a complicated circuit implementation and thus all solutions that simplify implementations at the component level are more than welcome. The CDMA system generally uses a Walsh-Hadamard transform which contains calculated information on the signal noise ration, which is explained in more detail in Finnish Patent Application 956359, and on the data transmission rate partly based on it.

SUMMARY OF THE INVENTION

The object of the present invention is to realize a solution which avoids parallel Viterbi decoding, whereby the implementation of the receiver will be simplified and where the calculation of time slots will be accelerated.

This will be provided by a method as shown in the preamble, which is characterized in that by utilizing correlation values of one or more correlation vectors, an estimate is formed for each data transmission rate representing the probability of the data transmission rate of the signal and that by means of the formed estimates, the most probable data transmission rate is selected to be used for detecting the signal.

The receiver of the invention is characterized in that the receiver comprises a means for forming comprises a means for forming an estimate of the probability of the data transmission rate by utilizing the correlation values of one or more correlation vectors, and that the receiver comprises a means for selecting on the basis of the estimates the most probable data transmission rate used for detecting the signal.

Considerable advantages are provided with the method of the invention. The calculation amount of the receiver will be diminished as all data transmission rates need not be examined and the equipment will be simplified when only one Viterbi decoder can be used instead of four parallel ones. This method can be used in serial type of Viterbi decoding of different data transmission rates. In comparison to parallel Viterbi decoding, the advantage of the invention is especially that decoding may be started from the most probable data transmission rate and when needed, proceed towards the least probable data transmission rate until the correct data transmission rate is found. Other data transmission rates need not be examined.

The preferred embodiments of the method of the invention appear from the appended dependent claims and the preferred embodiments of the receiver of the invention appear from the appended dependent claims relating to the receiver.

DESCRIPTION OF THE FIGURES

In the following, the invention will be described in more detail with reference to the examples of the accompanying drawings, where.

DESCRIPTION OF THE PREFERRED EMBODIMENTS OF THE INVENTION

Figure 1:
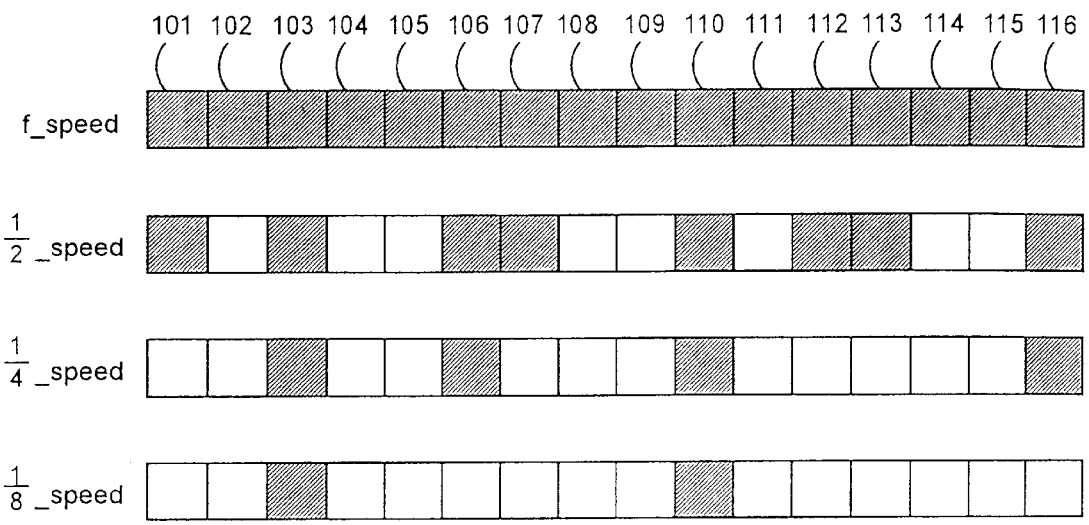
FIG. 1 shows the distribution of the used time slots in a frame at different data transmission rates.

The invention is presented here in the light of the CDMA technique, but the invention may also be used in other methods, wherever applicable. FIG. 1 shows a frame comprising sixteen time slots 101 to 116 typically used at different data transmission rates in a transmission of the CDMA cellular radio system. At the greatest data transmission rate information is transmitted by using all time slots 101 to 116. The greatest rate f_speed is typically 9600 bps or 14400 bps in the CDMA system. Other data transmission rates ½_speed, ¼_speed and ⅛_speed are derived by dividing the greatest data transmission rate by two, four and eight. At data transmission rate 4800 bps or 7200 bps are used eight time slots 101, 103, 106, 107, 110, 112, 113 and 116, at data transmission rate 2400 bps or 3600 bps four time slots 103, 106, 110 and 116 and at the slowest data transmission rate 1200 bps or 1800 bps two time slots 103 and 110. Nothing is transmitted in those time slots that are not used.

Figure 2:
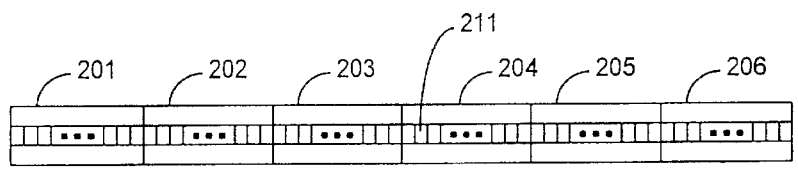
FIG. 2 shows the structure of a time slot.

FIG. 2 shows the structure of one time slot of the frame, comprising modulation symbols. Modulation symbols are generally submatrices of the transform matrix. When Walsh-Hadamard transform is used in the transmission, a time slot generally comprises six modulation symbols 201 to 206 formed as a vector, each of which symbols 201 to 206 comprises sixty-four Walsh chips 211. The modulation symbols 201 to 206 are formed in the transmitter of the CDMA system according to the prior art method so that the bits to be transmitted are converted in groups of six bits into numbers in the interval of 0 to 63, each of which is used to point to one Hadamard matrix out of sixty-four lines. Because the Hadamard matrix, which is one of the innumerable orthogonal transform matrices, is a matrix comprising sixty-four time sixty-four Walsh chips 211, each line, that is, each modulation symbol to be transmitted has sixty-four Walsh chips 211.

Figure 3:
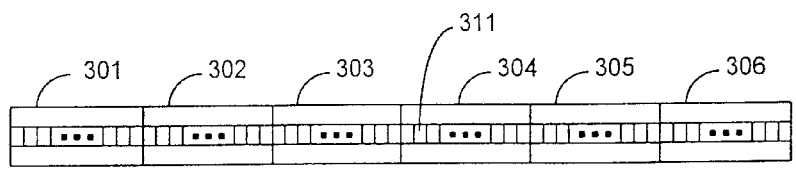
FIG. 3 shows correlation vectors.

FIG. 3 shows correlator vectors 301 to 306 of one time slot, each of the correlator vectors comprising sixty-four correlation values 311. The correlator vectors 301 to 306 are provided in the receiver so that a line of Hadamard matrix, that is, the modulation symbol 201 to 206 is multiplied in the receiver by Hadamard matrix. This is shown as a mathematical formulation in formula (1):

$$\begin{bmatrix} m1 \\ m2 \\ m3 \\ \vdots \\ m64 \end{bmatrix}^T \times \begin{bmatrix} H(1,1) & H(1,2) & H(1,3) & \cdots & H(1,64) \\ H(2,1) & H(2,2) & H(2,3) & \cdots & H(2,64) \\ H(3,1) & H(3,1) & H(3,3) & \cdots & H(3,64) \\ \vdots & \vdots & \vdots & \cdots & \vdots \\ H(64,1) & H(64,2) & H(64,3) & \cdots & H(64,64) \end{bmatrix} = \quad (1)$$

$$\begin{bmatrix} C1 \\ C2 \\ C3 \\ \vdots \\ C64 \end{bmatrix}^T,$$

where chips m1, m2, m3, . . . , m64 are Walsh chips of some modulation symbol 201 to 206, the matrix comprised of H(x,y) chips is a modulation matrix, preferably a Hadamard matrix and a correlator vector comprising correlation values c1, c2, c3, . . . , c64 is provided by the product of the above. Multiplying corresponds to the correlation between the Hadamard matrix and the modulation symbol, in which case the place, that is, the index of the maximum value of the correlation vector corresponds to the value of the transmitted six bits.

The method of the invention will be now viewed in more detail. The solution of the invention is suitable for use in a receiver of a radio system and especially of a cellular radio system, which receiver receives a signal having several data transmission rate alternatives f_speed, ½_speed, ¼_speed and ⅛_speed and comprising modulation symbols 201 to 206. The correlation vector 301 to 306 comprising correlation values 311 is provided as the product of the modulation symbol 301 to 306 and the modulation matrix at the reception. The modulation matrix is a Hadamard matrix in the CDMA system, in particular. In the solution of the invention, an estimate is provided for data transmission rates f_speed, ½_speed, ¼_speed and ⅛_speed representing the probability of the data transmission rate of the signal. This takes place by placing the data transmission rates f_speed, ½_speed, ¼_speed and ⅛_speed in the order of probability on the basis of the correlation values of one or more correlation vectors 301 to 306. In that case, the most probable data transmission rate f_speed, ½_speed, ¼_speed and ⅛_speed used for detecting the signal is selected on the basis of the estimate provided in the preferred embodiment of the invention. Thus unnecessary detection of different data transmission rates is avoided. By operating in this way, in most cases the data transmission rate selected first is correct and no other data transmission rates need be tested in the detection.

When the detection fails, the next most probable data transmission rate on the basis of the estimate is transferred to. Therefore if interference is so great that the probable data transmission rate f_speed, ½_speed, ¼_speed and ⅛_speed is not correct, but an error is detected in the check routines of reception, the data transmission rate can be changed into the next most probable one in the preferred solution of the invention. In that case detection and check routines are tested at a new data transmission rate. The data transmission rate is changed until the correct data transmission rate is found or when all the data transmission rates, which are provided with an estimate, have been examined. In the CDMA system there are typically in use four different data transmission rates f_speed, ½_speed, ¼_speed and ⅛_speed which are, for example, 9600 bps, 4800 bps, 2400 bps and 1200 bps. If all the data transmission rates selected on the basis of the estimate result in a failure of detection, which is found out in check routines, the method is repeated preferably as a whole, starting by forming an estimate.

The estimate representing the probability of each data transmission rate in each reception situation may be calculated in the preferred embodiment of the invention by forming first a quality value based on the relative correlation values of one or more correlation vectors 301 to 306. In the CDMA method six correlation vectors 301 to 306 are used when calculating relative values. After this, when the quality value of one or more time slots is compared to one another by their data transmission rates, an estimate representing the probability of each data transmission rate f_speed, ½_speed, ¼_speed and ⅛_speed can be provided. The relative values can be formed by definition by dividing the correlation values 311 by some correlation value 311, selected and proven to be good, preferably by the maximum value of the correlation values or any such value. The advantage of using relativity is that it emphasizes the differences between the used and unused time slots, whereby the used data transmission rate f_speed, ½_speed, ¼_speed and ⅛_speed can be deducted more easily as the correlation value 311 associated with the information transmitted in the used time slot is probably greater than in other time slots and in the correlation values 311 where noise regulates the greatness of the value.

The estimate representing the probability of the data transmission rate of a signal is provided more exactly in the preferred embodiment of the invention so that the following steps are gone through for each data transmission rate separately. The method can be started for example by calculating the maximum correlation values of one or more correlation vectors 301 to 306. These maximum values are most probably associated with the transmitted information. As there are six correlation vectors 301 to 306 in a time slot of the CDMA system, the mean value of two or more correlation vectors, preferably of the maximums of all six correlation vectors, is calculated, the mean value possibly being a statistical mean value, median or some other value representing the mean value. The relativity of the correlation values 311 can be utilized when the mean values of some other than the maximum are calculated from one or more correlation vectors 301 to 306, whereby a secondary mean value is derived by which the mean value of the maximums is divided. In that case a noise value $W_1$ representing the signal noise ratio is derived on the basis of the relative values of the correlator vector. This can be written, for example, as a formula in the following way:

$$W_1 = E[\text{Max}[c\_vector_j]]/E[\text{Max2}[c\_vector_j]], \quad (2)$$

where $W_1$ is the noise value, $c\_vector_j$ is the $j^{th}$ correlation vector of the correlation vectors 301 to 306, Max searches for the maximum value of the $j^{th}$ correlation vector and Max2 searches for some other predetermined correlation value, the second greatest correlation value, for example, E refers to combining the selected values of the correlator vectors, which is preferably averaging. This is based on that information is visible as a great correlation value, that is, as a maximum and the other values contain channel noise and unorthogonality in the transmission.

For providing the estimate, an upper_limit and lower_limit are further defined for noise value $W_1$ in the preferred embodiment of the invention. The upper limit defines a specified maximum value of the noise value, the values greater than the maximum value not being used in defining the estimate. The values lower than the lower limit are neither accepted. These limits may be supplied to the receiver in which case they are predetermined extreme limits or they can be provided again at times, preferably by frames on the basis of the correlation values 311. An advantage of the use of upper and lower limits is that the extreme values caused by noise can be cut out by means of them.

For calculating the estimate, the quality value is preferably calculated for all the time slots in use in the frame by selecting the maximum in the interval from zero to the difference between the upper limit and the noise value at each data transmission rate, that is, it can be written, for example, as a formula:

$$Q_E = \text{Max}[0, (upper\_limit - W_1)], \quad (3)$$

where upper_limit is the upper limit and $Q_E$ corresponds to Euclidean quality value. The quality value of those time slots that are not used at the data transmission rate on which the estimate is provided is calculated as the difference of the noise value $W_1$ and the lower limit, that is, as a formula:

$$Q_E = \text{Max}[0, (lower\_limit - W_1)], \quad (4)$$

where lower_limit is the lower limit. After this, the quality values $Q_E$ of all the time slots comprised by the frame are preferably summed by their transmission rates, whereby an estimate of probability for each transmission rate is derived. The probable data transmission rate f_speed, ½_speed, ¼_speed and ⅛_speed has the smallest sum of the quality values $Q_E$.

In the preferred embodiment of the invention, the secondary mean value is formed as a mean value of the second greatest values of one or more correlator vectors, preferably of the six correlator vectors 301 to 306 in the time slot of the CDMA system. The results of other than the maximum values of the correlator vector are produced by noise and unorthogonality of the transform. Therefore the ratio $W_1$ of the maximum values and the second greatest values provides the best estimate of the signal noise ratio as the noise of the second greatest correlation values is the strongest.

The upper_limit is provided in the preferred embodiment of the invention as a mean value between the greatest and smallest noise value $W_1$. The calculation of the upper limit is specific for each system and case and therefore different calculation methods producing a mean value are possible. The upper_limit may be provided statistically by a mean value, a median or other linear or non-linear averaging function. It is advantageous to maintain the upper limit constant at least during the whole frame, but it is also possible to maintain the upper limit the same during several frames. The effective factor in selecting the averaging function is that a great upper limit value favours low transmission rates (e.g. ¼_speed and ⅛_speed) and a small upper limit value favours high transmission rates (f_speed and ½_speed). It is preferable to select as the lower limit a theoretical minimum, which is one.

Figure 4:
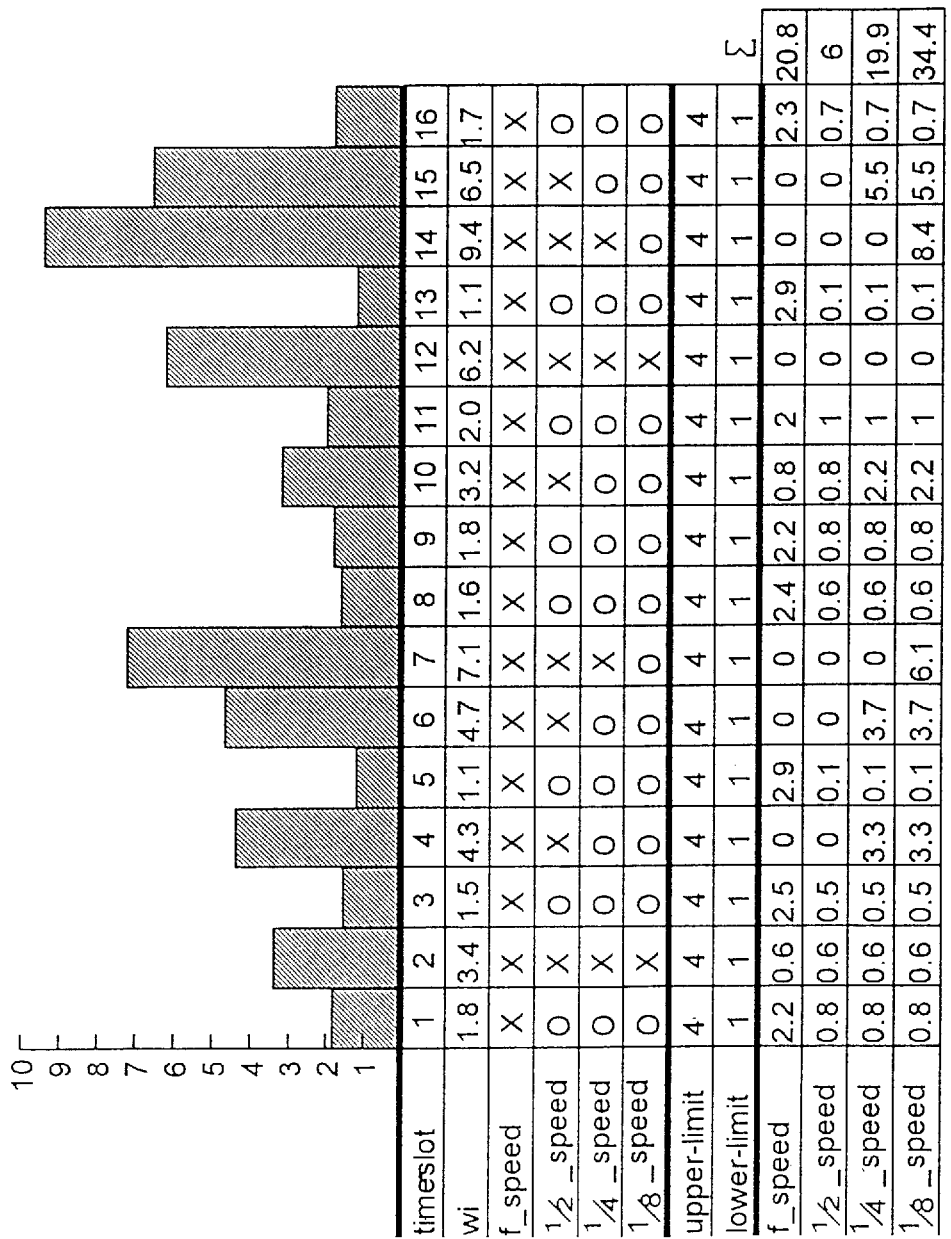
FIG. 4 shows an exemplary situation of the solution of the invention.

The operation of the solution of the invention is now examined by means of an example in FIG. 4. The upper part of the table shows a bar diagram representing the results already measured in the receiver, the noise value $W_1$ being calculated for each time slot of one frame. They are calculated by dividing the mean value of the maximum correlation values of six correlation vectors 301 to 306 by the mean value of the second greatest correlation values of the same six correlation vectors 301 to 306, which is part of the method according to the invention. The noise values $W_1$ are also shown in a numerical form in the table. The used time slots are indicated by X for each data transmission rate and the unused time slots are indicated by 0. In table 4, 4 is indicated as the upper_limit and the theoretical lower limit 1 as the lower_limit When only the noise values are calculated from the signal, the receiver does not yet know what the data transmission rate of the transmission will be.

By calculating with formulae (3) and (4), quality values $Q_E$ are derived for the used and unused time slots at all data transmission rates as an Euclidean distance. In that case, in time slot 3 a quality value Max[0,(1.5−1)], which is 0.5, is provided at the data transmission rate ¼_speed. Similarly, in time slot 12 a quality value Max[0, (4−6.2)], which is 0, is provided at the greatest data transmission rate f_speed. The summing of the quality values $Q_E$ by data transmission rates provides an estimate describing the probability of the data transmission rate of the received signal. In this method of the invention the smallest sum represents the most probable data transmission rate. In the case of FIG. 4, the data transmission rates assume an order on the basis of their probability, that is, the smallness of the sum so that the most probable one is ½_speed (sum 6), which is followed by ¼_speed (sum 19.9), f_speed (sum 20.8) and ⅛_speed (sum 34.4). In this exemplary case, the detection would be started by using a data transmission rate which is half of the greatest rate, that is, ½_speed.

The method of FIG. 4 shown above is described by using Euclidean distance of the quality value, that is, soft decision. The estimate of the data transmission rate can also be calculated by using Hamming distance, that is, hard decision, whereby either 1 or 0 is selected as the quality value $Q_H$ based on what the result $Q_E$ of the formulae (3) and (4) will be. In this method a threshold value is needed for deciding if $Q_H$ is 1 or 0. The part of the table of FIG. 4 showing the Euclidean distances is in Hamming distance as follows, when numeral 2 is selected as the threshold value:

|  | Hamming | | | | | | | | | | | | | | | | |
| --- | --- | --- | --- | --- | --- | --- | --- | --- | --- | --- | --- | --- | --- | --- | --- | --- | --- |
| f_speed | 1 | 0 | 1 | 0 | 1 | 0 | 0 | 1 | 1 | 0 | 1 | 0 | 1 | 0 | 0 | 1 | 8 |
| ½_speed | 0 | 0 | 0 | 0 | 0 | 0 | 0 | 0 | 0 | 0 | 0 | 0 | 0 | 0 | 0 | 0 | 0 |
| ¼_speed | 0 | 0 | 0 | 1 | 0 | 1 | 0 | 0 | 0 | 1 | 0 | 0 | 0 | 0 | 1 | 0 | 4 |
| ⅛_speed | 0 | 0 | 0 | 1 | 0 | 1 | 1 | 0 | 0 | 1 | 0 | 0 | 0 | 1 | 1 | 0 | 6 |

The results are calculated in such a manner that if the result $Q_E$ of formula (3) or (4) has a threshold of two or greater, the quality value $Q_H$ is 1. If $Q_E$ is less than two, the quality value $Q_H$ is 0. The sum of ones for each data transmission rate is indicated in the last column. Therefore even by a hard decision half of the greatest data transmission rate, that is, ½_speed is derived as the most probable data transmission rate. The order of only the greatest speed f_speed and the slowest rate ⅛_speed will change. Especially in this example it can be seen that the method can also be made in such a manner that either the greatest sum or the smallest sum represents the most probable data transmission rate. That is, if the quality value of the hard decision is formed so that when the formulae (3) and (4) give as a result $Q_E$ is less than two, the quality value $Q_H$ will be 1 and when the formulae (3) and (4) give as a result $Q_E$ is two or more, the quality value $Q_H$ will be 0, the most probable data transmission rate will have the greatest sum of the quality figures. The same applies to the soft decision if the forming of the quality figure is similarly changed.

Figure 5:
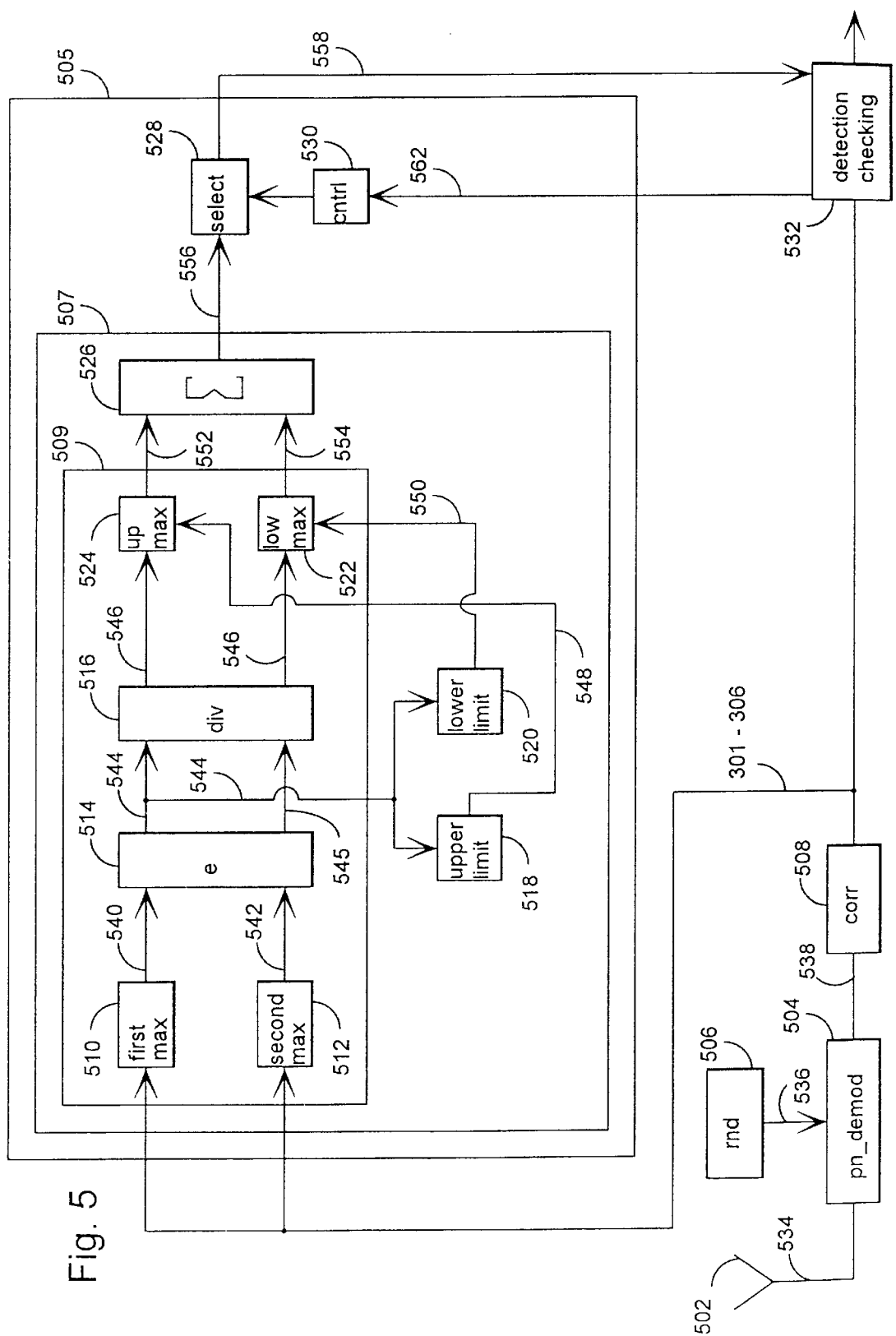
FIG. 5 shows the receiver of the invention.

FIG. 5 shows the receiver of the invention comprising an antenna 502, a pseudo-random signal demodulator (PN demodulator) 504, a random number generator 506, a correlator 508 and a means 505 for providing estimates for different data transmission rates and for selecting the most probable data transmission rate on the basis of the estimates and the information from check routines. Further, a receiver typically comprises other means 532 for processing the signal, which means comprise e.g. de-interleaving means and Viterbi decoding means for decoding the convolution coding of the transmission.

The different means are operationally connected to each other in the following way. A signal 534 from the antenna 502 of the receiver propagates to the PN-demodulator where the signal is I/Q demodulated and the signal is changed to narrowband by a false random code from the random number generator 506. A narrowband signal 538 propagates to the correlator 508. The modulation symbol of the signal received in the correlator 508 is multiplied, as in formula (1), for forming a correlation vector by a transform matrix which is typically Hadamard matrix in the CDMA system. The correlation vectors 301 to 306 comprised by the time slot propagate to the means 505 which comprises both a means 507 for providing the estimates by the method of the invention for different data transmission rates and a means 528 for selecting the most probable data transmission rate for detection. The correlation vectors 301 to 306 propagate forwards to further processes in means 532 which will carry out e.g. de-interleaving and decode the signal encoded in some known method.

The inventive part of the receiver is now examined in more detail. The means 505 thus comprises the means 507 for providing the estimates with the method of the invention for different data transmission rates f_speed, ½_speed, ¼_speed and ⅛_speed, after which the means 528 selects on the basis of the provided estimates the most probable data transmission rate for detection. The receiver further comprises a means 530 controlling the means 528 by the signal 560 for propagating on the basis of the estimate from one data transmission rate to another if it is detected in the check phase of detection that the detection cannot be done with the data transmission rate estimated on the basis of the estimate, which is informed as a signal 562 from the means 532 to the means 530. Further, the means 530 instructs by a signal 564 the means 507 of the receiver to start forming the estimate again if the detection is not possible by the estimated data transmission rates. The receiver further comprises a means 509 for forming a quality value 552 and 554 ($Q_E$ or $Q_H$) which is based on the relative correlation values 544 and 545 of the correlation vectors 301 to 306. The means 509 is preferably situated in the means 507 where the correlation vectors 301 to 306 are received from the correlator 508. In that case the relative values 544 and 545 are preferably formed by dividing a combination 540 of the greatest values of the correlation vectors by some appropriate value. This appropriate value is for example a combination 542 of other than the greatest values of the correlation vectors. An averaging means 514 is preferably used to form the combination of values. In this way the means 507 compares by using the means 526 the quality values 552 and 554 by transmission rates and thus forms the estimate 556 representing the probability of the transmission rate. In order to form the quality values 552 and 554, the receiver comprises a means according to the prior art for forming a maximum value from the received correlation vectors 301 to 306. The mean value 544 is formed with the means 514 and this means 514 is used to form the mean value of the maximums 540 of the correlation vectors and the secondary mean value from other values 542 than the maximum correlation values of the correlation vectors. The secondary mean value is preferably formed by using the second greatest values 542 of the correlation vectors 301 to 306 which values the means 512 is preferably arranged to form. The CDMA system preferably uses the second greatest values of the six correlation vectors of the time slot. Correspondingly, the mean value of the maximums is formed most preferably by using the greatest values of the correlation vector and in the CDMA system by using the greatest values of six correlation vectors of the time slot. The receiver also comprises a means 516 where the mean value of the maximums is divided by the secondary mean value indicated by the signal 544. In that case the relative correlation values of formula (2), that is, noise values $W_1$ are obtained in the means 509. The receiver also comprises means 518 and 520 by which an upper_limit 548 and a lower_limit 550 are defined for forming the estimate. The means 518 defines the upper limit 548 by the method of the invention and the means 520 defines the lower limit 550 which is normally the theoretical lower limit, i.e. one, in which case it is not specifically defined, but it is set. The quality values 552 and 554 of formulae (3) and (4) are preferably formed by the means 524 and 522 from the signals 546, 548 and 550, after which this information is transferred to a combination means 526 with which the quality values 552 and 554 are preferably summed by transmission rates. These estimates 556 of the data transmission rate are thus formed and the means 528 selects from these estimates the most probable estimate 558 by means of the control 530. The means 505 of the receiver comprising the invention may be in practice realized either completely or partly by separate components or integrated components or circuits comprising the processor or controlled by the processor, typically provided with memory, by means of which the means 505 realizes the method of the invention either by a software or hardware implementation. More exactly, the means 505 is typically a digital signal processor, that is, a DSP or ASIC circuit.

Although the invention has been explained above with reference to the examples of the drawings, it is evident that the invention is not restricted thereto but it can be modified in many ways within the scope of the inventive idea disclosed in the accompanying claims.

What is claimed is:

1. A method for identifying data transmission rate from a signal composed of a succession of frames, which signal has several transmission rate alternatives and comprises modulation symbols (201 to 206) which are formed as a vector and which are submatrices of a known modulation matrix selected on the basis of a combination of bits to be transmitted, in which method a correlation is formed between a received modulation symbol (201 to 206) and the known modulation matrix, as a result of which at least one correlation vector (301 to 306) is produced, the at least one correlation vector comprising correlation values (311) and by means of which the signal is detected, characterized in that by utilizing the correlation values (311) of the at least one correlation vector (301 to 306), an estimate (556) is formed for each data transmission rate representing the probability of the data transmission rate of the signal, and
that by means of the estimates (556), the most probable data transmission rate is selected to be used for detecting the signal,
and further characterized in that when each frame comprises time slots (101 to 116), the estimate (556) representing the probability of the transmission rate is formed in such a manner that
a quality value (552 and 554) based on the correlation values of at least one time slot (101 to 116) is formed,
by comparing the quality value (552 and 554) of the at least one time slot (101 to 116) to one another by data transmission rates, the estimate representing the probability of the data transmission rate is formed.

2. A method according to claim 1, characterized in that when the detection fails at the selected data transmission rate, the next most probable data transmission rate on the basis of the estimates (556) is selected and the method is repeated if all the data transmission rates selected on the basis of the estimates (556) result in a failure of detection.

3. A method according to claim 1, characterized in that the correlation values are formed by dividing a combination (544) of the greatest correlation values of the correlation vectors (301 to 306) by a combination (545) of the correlation values smaller than the greatest value of the correlation vector, which combination is preferably averaging.

4. A method for identifying data transmission rate from a signal composed of a succession of frames, which signal has several transmission rate alternatives and comprises modulation symbols (201 to 206) which are formed as a vector and which are submatrices of a known modulation matrix selected on the basis of a combination of bits to be transmitted, in which method a correlation is formed between a received modulation symbol (201 to 206) and the known modulation matrix, as a result of which at least one correlation vector (301 to 306) is produced, the at least one correlation vector comprising correlation values (311) and by means of which the signal is detected, characterized in that by utilizing the correlation values (311) of the at least one correlation vector (301 to 306), an estimate (556) is formed for each data transmission rate representing the probability of the data transmission rate of the signal, and
that by means of the estimates (556), the most probable data transmission rate is selected to be used for detecting the signal,
and further characterized in that when each frame comprises time slots (101 to 106), the estimate (556) representing the probability of the data transmission rate is formed so that the following steps are gone through separately for each data transmission rate:
A) a maximum value (540) of each of at least one correlation vector (301 to 306) is calculated,
a mean value (544) of the at least one maximum value is calculated,
a secondary mean value (545) of at least one secondary value (542) other than the maximum value of the at least one correlation vector (301 to 306) is calculated,
the mean value (544) of the at least one maximum value is divided by the secondary mean value (545), whereby a noise value (546) based on relative values of the correlation vector, representing the signal noise ratio, is derived,
an upper limit (548) and a lower limit (550) are defined for the noise value,
B) a first quality value (552) is calculated by selecting the maximum value in the interval from zero to the difference of the upper limit (548) and the noise value for the time slots in use,
a second quality value (554) is calculated as a difference of the noise value and the lower limit (550) for other time slots than the ones in use, and
C) the first and second quality values (552 and 554) are summed by transmission rates, whereby the estimate (556) of the probability of each transmission rate is derived.

5. A method according to claim 4, characterized in that the secondary mean value (545) is formed as a mean value of the second greatest of each of the at least one correlation vector (301 to 306).

6. A method according to claim 4, characterized in that the upper limit (548) is formed as a mean value between the greatest and the smallest noise values and that a theoretical minimum, which is one, is preferably selected as the lower limit (550).

7. A receiver receiving a signal which has several data transmission rate alternatives and which comprises modulation symbols (201 to 206) which are formed as a vector and which are submatrices of a known modulation matrix selected on the basis of a combination of bits to be transmitted, which receiver is arranged to form a correlation between a received modulation symbol (201 to 206) and the known modulation matrix, as a result of which correlation vectors (301 to 306) are produced, each vector comprising correlation values (311) and by means of which the signal is arranged to be detected, characterized in that the receiver comprises means (507) for forming, for each transmission rate, an estimate (556) of the probability of the data transmission rate by utilizing the correlation values (311) of one or more correlation vectors (301 to 306), that the receiver comprises means (528) for selecting on the basis of the estimate (556) the most probable data transmission rate used for detecting the signal, and that the receiver comprises means (530) for changing the data transmission rate into the next probable data transmission rate when the detection fails and for instructing the receiver to start forming the estimate again if all the data transmission rates selected on the basis of the estimate (556) result in a failure of detection.

8. A receiver receiving a signal composed of a succession of frames, which signal has several data transmission rate alternatives and which comprises modulation symbols (201 to 206) which are formed as a vector and which are submatrices of a known modulation matrix selected on the basis of a combination of bits to be transmitted, which receiver is arranged to form a correlation between a received modulation symbol (201 to 206) and the known modulation matrix, as a result of which correlation vectors (301 to 306) are produced, each vector comprising correlation values (311) and by means of which the signal is arranged to be detected, characterized in that the receiver comprises means (507) for forming, for each transmission rate, an estimate (556) of the probability of the data transmission rate by utilizing the correlation values (311) of one or more correlation vectors (301 to 306), that the receiver comprises means (528) for selecting on the basis of the estimates (556) the most probable data transmission rate used for detecting the signal, that when each frame comprises time slots (101 to 116), the receiver comprises means (509) for forming a quality value (552 and 554) based on relative correlation values of the correlation vectors (301 to 306), which relative correlation values are preferably formed by dividing a combination (544) of the greatest correlation value of the correlation vectors by a combination (545) of the correlation values smaller than the greatest correlation value of the correlation vectors, and that the means (528) for selecting the transmission rate is arranged to compare the quality value (552 and 554) of one or more time slots (101 to 116) to each other by data transmission rates.

9. A receiver receiving a signal composed of a succession of frames each containing a plurality of time slots, which signal as several data transmission rate alternatives and which comprises modulation symbols (201 to 206) which are formed as a vector and which are submatrices of a known modulation matrix selected on the basis of a combination of bits to be transmitted, the signal being transmitted in a number of time slots in each frame for each transmission rate, which receiver is arranged to form a correlation between a received modulation symbol (201 to 206) and the known modulation matrix, as a result of which correlation vectors (301 to 306) are produced, each vector comprising correlation values (311) and by means of which the signal is arranged to be detected, characterized in that the receiver comprises means (507) for forming, for each transmission rate, an estimate (556) of the probability of the data transmission rate by utilizing the correlation values (311) of at least one correlation vector (301 to 306), that the receiver comprises means (528) for selecting on the basis of the estimates (556) the most probable data transmission rate used for detecting the signal, and that the means (507) comprised by the receiver for forming the estimate (556) comprises:

means (510) for forming a maximum value (540) of each of at least one correlation vector, means (514) for forming a mean value of the maximum value of the at least one correlation vector, whereby the mean value is derived, means (514) for forming a secondary mean value (545) as a mean value of at least one secondary value other than the maximum value of the at least one correlation vector, means (516) for dividing the mean value (544) of the maximum value by the secondary mean value (545), whereby a noise value (546) based on relative values of the at least one correlation vector, representing the signal noise ratio, is derived, means (518 and 520) for defining an upper limit (548) and a lower limit (550) for the noise value (546), means (524) for forming a first quality value (552) by selecting the maximum value in the interval from zero to the difference of the upper limit and the noise value for the time slots in which the signal is transmitted, means (522) for forming a second quality value (554) as the difference of the noise value and the lower limit (550) for other time slots than the ones in which the signal is transmitted, and means (526) for summing the first and second quality values (552 and 554) by transmission rates, whereby the estimate (556) of the probability of each transmission rate is derived.

10. A receiver according to claim 9, characterized in that the means (512) for forming the secondary mean value (545) is arranged to use the second greatest (542) of each of the at least one correlation vector.

11. A receiver according to claim 9, characterized in that the means (518 and 520) for defining the upper limit (548) and the lower limit (550) comprises means (518) for forming an upper limit value (548) between the greatest and the smallest values of the noise value (546) as a mean value, and means (520) for forming a lower limit value (550) which is preferably arranged to select as the lower limit value a theoretical minimum, which is one.

12. A receiver according to claim 9, characterized in that when the signal comprises frames, the means (507) for forming the estimate (556) of the probability of the data transmission rate is arranged to form an estimate separately for each frame.

* * * * *